United States Patent
Jee et al.

(10) Patent No.: US 8,279,174 B2
(45) Date of Patent: Oct. 2, 2012

(54) DISPLAY DEVICE AND METHOD OF CONTROLLING THE DISPLAY DEVICE

(75) Inventors: Hyun Ho Jee, Seoul (KR); Ha Sung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 12/542,242

(22) Filed: Aug. 17, 2009

(65) Prior Publication Data

US 2010/0053081 A1    Mar. 4, 2010

(30) Foreign Application Priority Data

Aug. 27, 2008 (KR) .................. 10-2008-0084076
Nov. 5, 2008 (KR) .................. 10-2008-0109550

(51) Int. Cl.
*G06F 3/033* (2006.01)
(52) U.S. Cl. ............... 345/157; 345/1.1; 345/156
(58) Field of Classification Search ............ 345/1.1–2.3, 345/156–169, 173–178; 455/566
See application file for complete search history.

(56) References Cited

U.S. PATENT DOCUMENTS 7,844,301 B2* 11/2010 Lee et al. ............... 455/566
2005/0040753 A1* 2/2005 Osame et al. ............ 313/500

FOREIGN PATENT DOCUMENTS

CN    1949905 A    4/2007

OTHER PUBLICATIONS

Chinese Office Action dated Jul. 26, 2011 issued in Application No. 200910170953.1 (with translation).

* cited by examiner

*Primary Examiner* — Vijay Shankar
(74) *Attorney, Agent, or Firm* — KED & Associates, LLP

(57) ABSTRACT

A mobile terminal is provided that includes a first display module to receive a touch signal and a second display module configured to be extensible. An image and a pointer may be displayed on the second display module if the second display is ejected from the mobile terminal. The pointer may move according to a drag direction and a drag distance corresponding to the touch signal if a touch signal with directivity is detected from the first display module. A character-input operation and/or a search operation may be performed on the image displayed on the second display module using the first display module.

21 Claims, 15 Drawing Sheets

(a)

(b)

FIG. 11
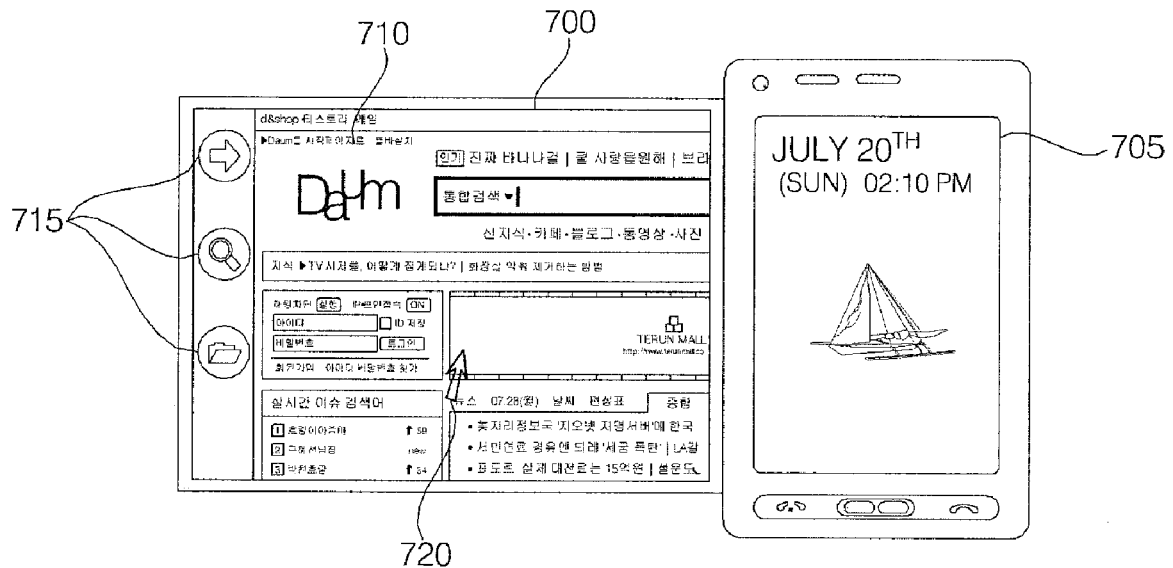
(a)
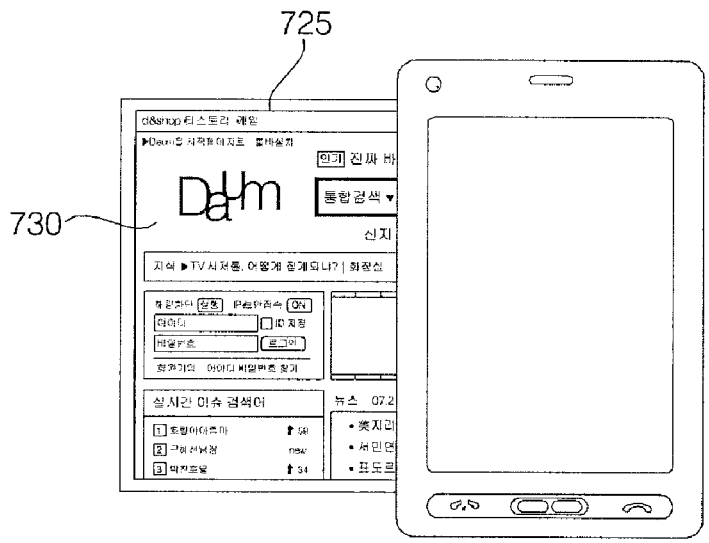
(b)

FIG. 13
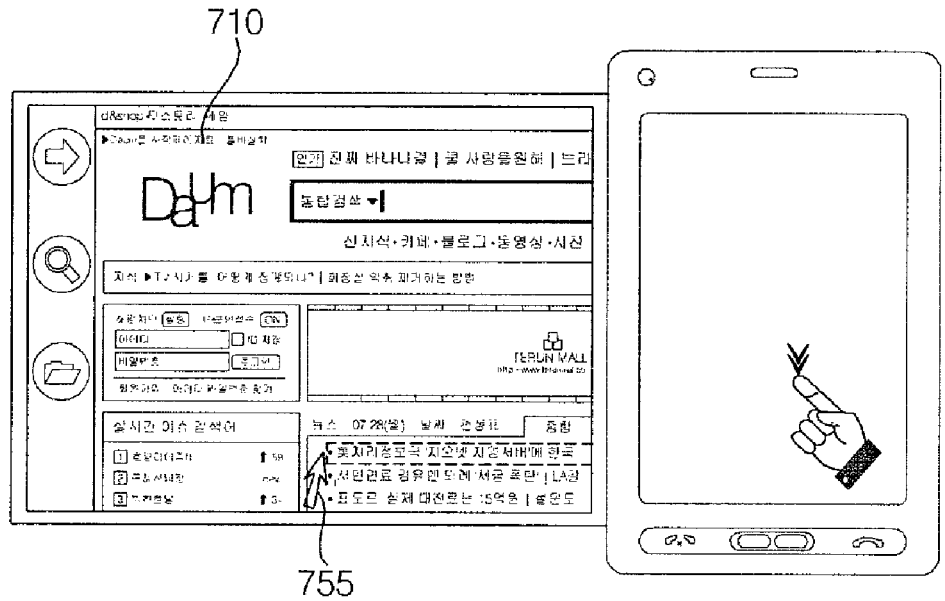
(a)
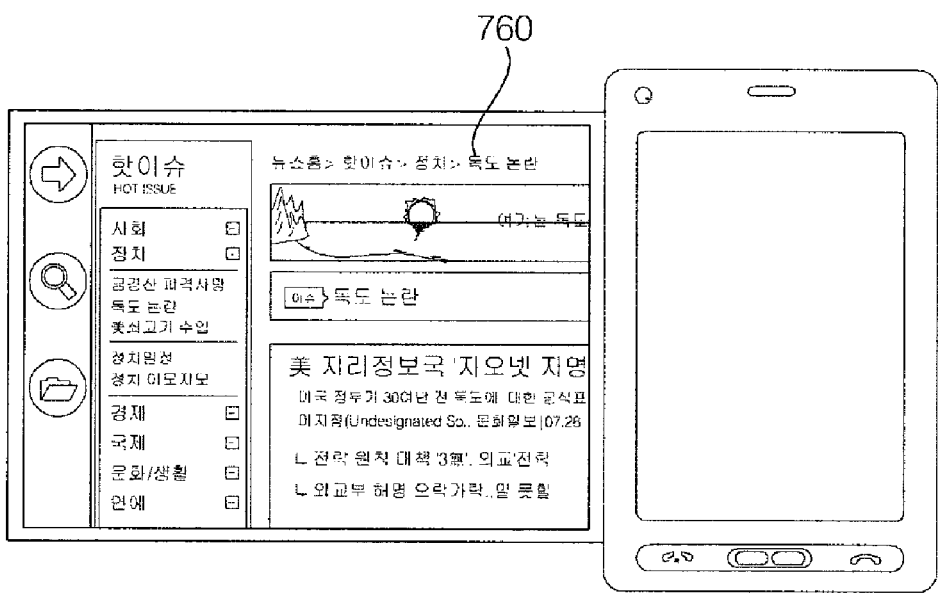
(b)

DISPLAY DEVICE AND METHOD OF CONTROLLING THE DISPLAY DEVICE

This application claims priority benefit from Korean Patent Application No. 10-2008-0084076, filed Aug. 27, 2008 and from Korean Patent Application No. 10-2008-0109550 filed Nov. 5, 2008, the subject matters of which are incorporated herein by reference

BACKGROUND

1. Field

Embodiments of the present disclosure may relate to a mobile terminal and a method of controlling the mobile terminal in which an operation of the mobile terminal can be controlled in various manners using an extensible display.

2. Background

Mobile terminals are portable devices that can provide users with various services such as a voice calling service, a video calling service, an information input/output service, and/or a data storage service.

As types of services provided by mobile terminals diversify, mobile terminals have been equipped with various complicated functions such as capturing photos or moving pictures, playing music files or moving image files, providing game programs, receiving broadcast programs and providing wireless Internet services. Mobile terminals have thus evolved into multimedia players, and generally, such control of functions are provided on a display.

BRIEF DESCRIPTION OF THE DRAWINGS

Arrangements and embodiments may be described in detail with reference to the following drawings in which like reference numerals refer to like elements and wherein:

FIGS. 11 through 13 illustrate diagrams for explaining the method of the second example embodiment.

DETAILED DESCRIPTION

Figure 1:
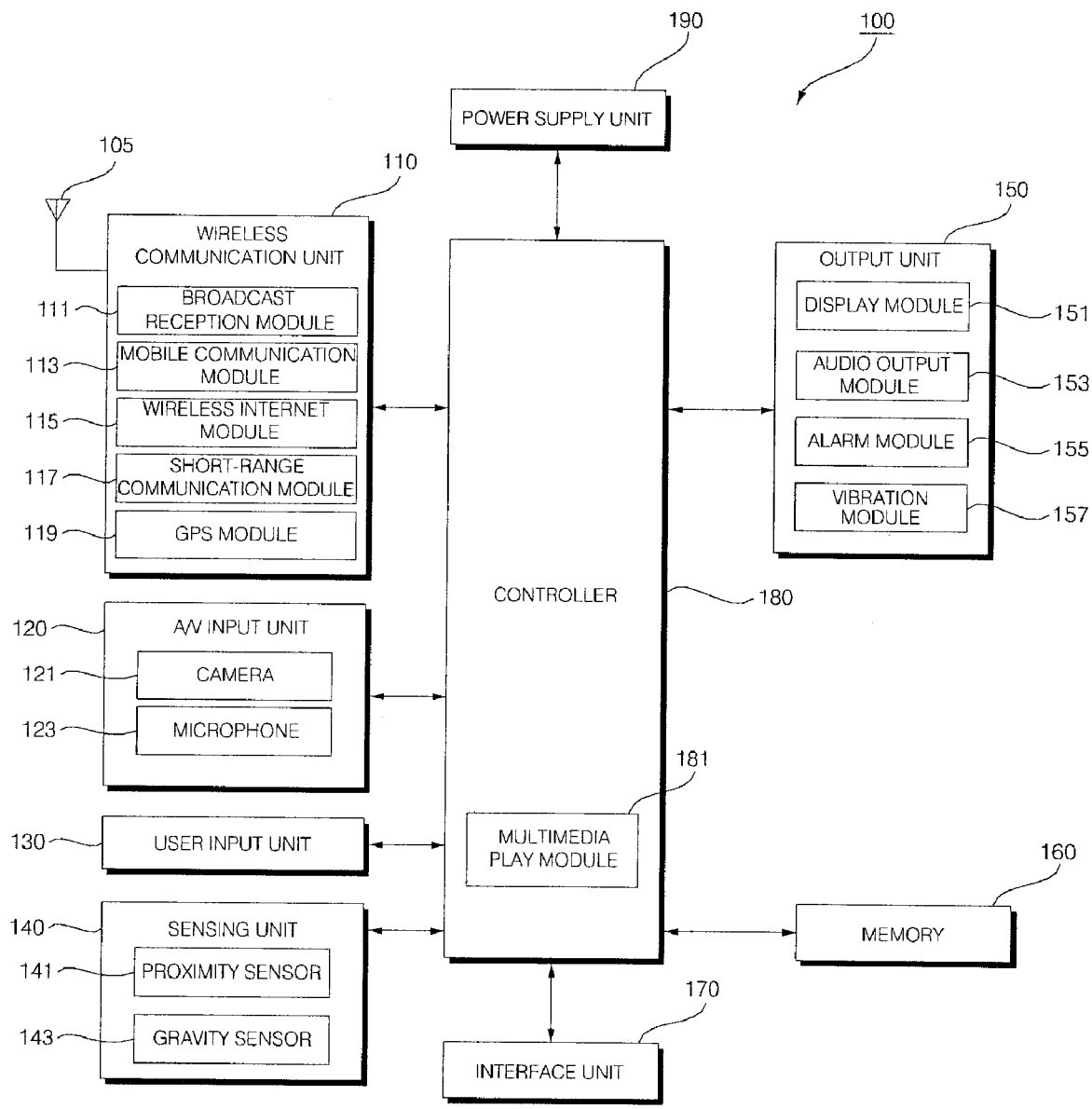
FIG. 1 illustrates a block diagram of a mobile terminal according to an exemplary embodiment.

Attempts have been made to realize the complicated functions as hardware devices or software programs. A demand for various designs for mobile terminals such as a double-sided liquid crystal display (LCD), a flexible display, a full-touch screen and/or a transparent display has steadily grown due to a growing tendency of considering mobile terminals as personal items that can represent a personal individuality.

Flexible displays, unlike typical flat-panel displays, may be folded and/or bent like paper. Flexible displays may provide large display screens and may contribute to a reduction of size of mobile terminals.

Embodiments of the present disclosure may provide a mobile terminal and a method of controlling the mobile terminal in which convenience of use of various images displayed on a flexible display may be improved by enabling a search of images and input of characters using a touch screen.

Embodiments of the present disclosure may also provide a mobile terminal and a method of controlling the mobile terminal in which an area of a display region may be increased using a flexible display and functions of a mouse may be provided using a touch screen.

A method of controlling a mobile terminal that includes a first display module configured to be able to receive a touch signal and a second display module configured to be extensible. The method may include displaying an image and a pointer on the second display module if the second display is ejected from the mobile terminal, and moving the pointer according to a drag direction and a drag distance corresponding to the touch signal if a touch signal with directivity is detected from the first display module.

A mobile terminal may include a first display module configured to be able to receive a touch signal, a second display module configured to be extensible, and a controller configured to display an image and a pointer on the second display module when the second display is ejected from the mobile terminal. Additionally, the controller moves the pointer according to a drag direction and a drag distance corresponding to the touch signal if a touch signal with directivity is detected from the first display module.

The method of controlling the mobile terminal may also include displaying an image and a pointer on the second display module if the second display is ejected from the mobile terminal; moving the pointer according to a drag direction and a drag distance corresponding to the touch signal if a first touch signal with directivity is detected from a first area of the display module, and displaying a screen for executing an item currently being pointed at by the pointer on the second display module if a second touch signal is detected from a second area of the display module.

A mobile terminal may include a first display module configured to be able to receive a touch signal, a second display module configured to be extensible, and a controller configured to display an image and a pointer on the second display module when the second display is ejected from the mobile terminal. The controller may move the pointer according to a drag direction and a drag distance corresponding to the touch signal if a first touch signal with directivity is detected from a first area of the display module. The controller may display a screen for executing an item currently being pointed at by the pointer on the second display module if a second touch signal is detected from a second area of the display module.

The term 'mobile terminal', may indicate a mobile phone, a smart phone, a laptop computer, a digital broadcast receiver, a personal digital assistant (PDA), a portable multimedia player (PMP), or a navigation device. The terms 'module' and 'unit' may be used interchangeably.

FIG. 1 illustrates a block diagram of a mobile terminal according to an example embodiment. As shown in FIG. 1, a mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server that generates broadcast signals and/or broadcast-related information and transmits the generated broadcast signals and/or the generated broadcast-related information or the broadcast management server may be a server that receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, a combination of a data broadcast signal and a TV broadcast signal or a combination of a data broadcast signal and a radio broadcast signal. The broadcast-related information may be provided to the mobile terminal 100 through a mobile communication network. The broadcast-related information may be received by the mobile communication module 113, rather than by the broadcast reception module 111. The broadcast-related information may be provided in various forms. For example, the broadcast-related information may be an electronic program guide (EPG) of digital multimedia broadcasting (DMB) or may be an electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receive wireless signals from at least one of a base station, an external terminal, and a server through a mobile communication network. The wireless signals may include various types of data according to whether the mobile terminal 100 transmits/receives voice call signals, video call signals, and/or text/multimedia messages.

The wireless Internet module 115 may be a module for wirelessly accessing the Internet. The wireless Internet module 115 may be embedded in the mobile terminal 100 or may be installed in an external device. The wireless Internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and/or ZigBee.

The GPS module 119 may receive position information from a plurality of GPS satellites.

The A/V input unit 120 may receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, and/or a voice recognition mode using a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms (or noise canceling algorithms) to remove noise that may be generated during reception of external sound signals.

The user input unit 130 may generate key input data based on user input for controlling an operation of the mobile terminal 100. The user input unit 130 may be implemented as a keypad, a dome switch, a touch pad (static pressure/static voltage), a jog wheel, and/or a jog switch. In particular, if the user input unit 130 is implemented as a touch pad and forms a layer structure together with the display module 151, the user input unit 130 and the display module 151 may be collectively referred to as a touch screen.

The sensing unit 140 may include a gravity sensor 143. The gravity sensor 143 may any type of sensor that can detect rotation of the mobile terminal 100 and determine a direction of gravity upon rotation of the mobile terminal 100. The gravity sensor 143 may have a weight connected to a variable resistor and may thus detect the rotation of the mobile terminal 100 based on a variation in the resistance of the variable resistor. Alternatively, the gravity sensor 143 may include a conductive material provided at a center of the gravity sensor 143 and may thus detect the rotation of the mobile terminal 100 based on a direction in which the conductive material is placed in contact with the gravity sensor 143.

The sensing unit 140 may include a proximity sensor 141. The proximity sensor 141 may determine whether there is an entity nearby and approaching the mobile terminal 100 without any mechanical contact with the entity. More specifically, the proximity sensor 141 may detect an entity that is nearby and approaching by detecting a change in an alternating magnetic field or a rate of change of a static capacitance. The sensing unit 140 may include two or more proximity sensors 141.

The output unit 150 may output audio signals, video signals and/or alarm signals. The output unit 150 may include the display module 151, an audio output module 153, an alarm module 155 and a vibration module 157.

The display module 151 may display various information processed by the mobile terminal 100. For example, if the mobile terminal 100 is in a call mode, the display module 151 may display a user interface (UT) or a graphic user interface (GUT) for making or receiving a call. If the mobile terminal 100 is in a video call mode or an image capturing mode, the display module 151 may display a UT or a GUT for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel may be a transparent panel attached to an exterior of the mobile terminal 100 and may be connected to an internal bus of the mobile terminal 100. The touch screen panel may keep monitoring whether the touch screen panel is being touched by the user. Once a touch input to the touch screen panel is detected, the touch screen panel may transmit a number of signals corresponding to the touch input to the touch screen panel controller. The touch screen panel controller may process the signals transmitted by the touch screen panel, and transmit the processed signals to the controller 180. The controller 180 may determine whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, a three-dimensional (3D) display and/or a transparent display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, and/or a broadcast reception mode or the audio output module may output audio data present in the memory 160. In addition, the audio output module 153 may output various sound signals associated with functions of the mobile terminal 100 such as receiving a call or a message. The audio output module 153 may include a speaker and a buzzer.

The alarm module 155 may output an alarm signal indicating occurrence of an event in the mobile terminal 100. Examples of the event may include receiving a call signal, receiving a message, and receiving a key signal. Examples of the alarm signal output by the alarm module 155 may include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may easily recognize the occurrence of an event based on an alarm signal output by the alarm module 155. An alarm signal for notifying the user of the occurrence of an event may be output not only by the alarm module 155 but also by the display module 151 or the audio output module 153.

The memory 160 may store various programs necessary for the operation of the controller 180. The memory 160 may temporarily store various data such as a phonebook, messages, still images, and/or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage that performs functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, and/or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control a general operation of the mobile terminal 100. For example, the controller 180 may perform various control operations regarding making/receiving a voice call, transmitting/receiving data, and/or making/receiving a video call. The controller 180 may include a multimedia play module 181 that plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or by an internal power source. The power supply unit 190 may supply power to other components in the mobile terminal 100.

The mobile terminal 100 may include a wired/wireless communication system and a satellite-based communication system. The mobile terminal 100 may operate in a communication system transmitting data as frames or packets.

The exterior of the mobile terminal 100 will hereafter be described with reference to FIGS. 2 through 4. For ease of description, the mobile terminal 100 is considered a bar-type mobile terminal equipped with a full-touch screen. However, embodiments are not limited to a bar-type mobile terminal, as embodiments may be applied to various mobile phones other than a bar-type mobile terminal.

Figure 2:
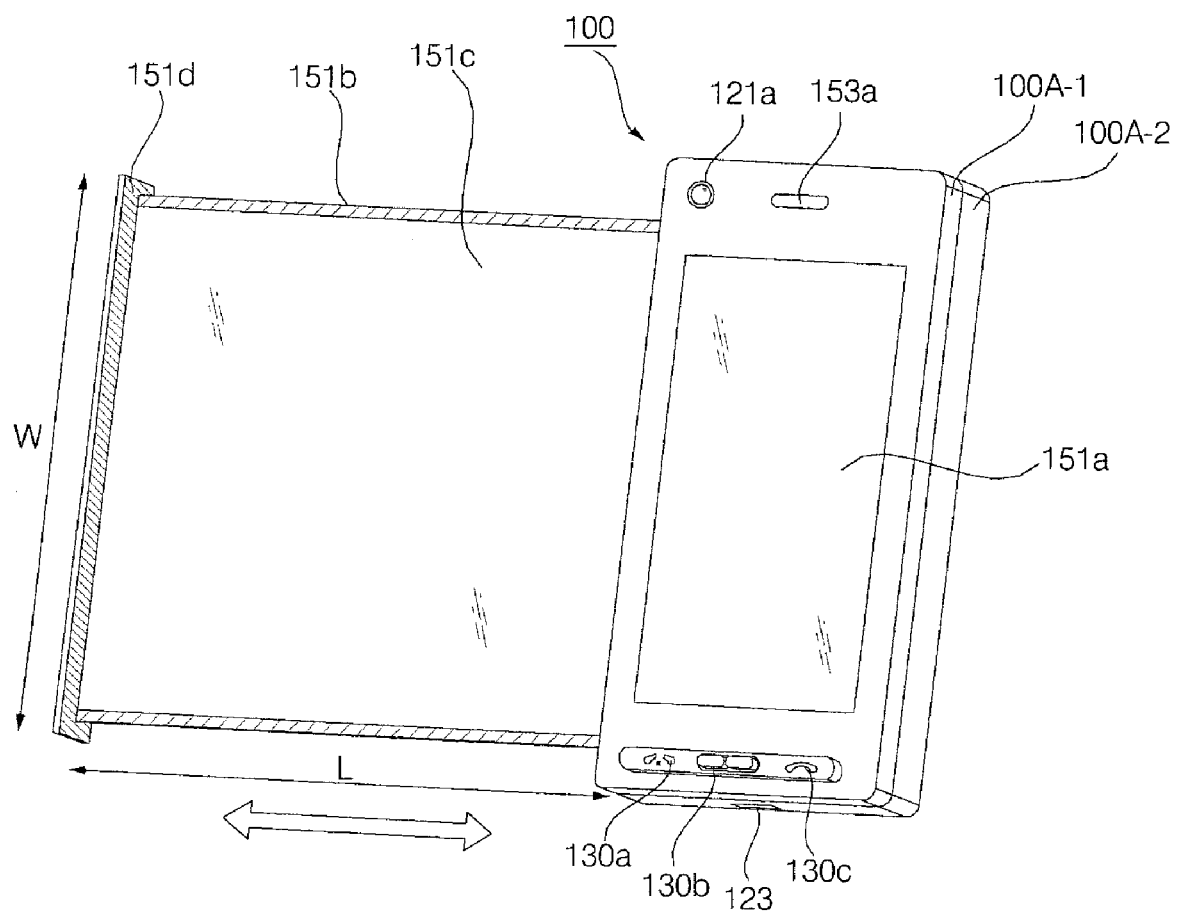
FIG. 2 illustrates a front perspective view of an example of the mobile terminal shown in FIG. 1.

FIG. 2 illustrates a front perspective view of the mobile terminal 100 shown in FIG. 1. As shown in FIG. 2, an exterior of a first body 100A may be defined by a front case 100A-1 and a rear case 100A-2. Various electronic devices may be installed in a space formed by the front case 100A-1 and the rear case 100A-2. At least one intermediate case may be additionally provided between the front case 100A-1 and the rear case 100A-2. The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

A first display module 151a, a first audio output module 153a, a first camera 121a and first through third user input units 130a through 130c may be provided on the front case 100A-1. The microphone 123 may be provided on one side of the rear case 100A-2.

A second display module 151b may be provided between the front case 100A-1 and the rear case 100A-2. The second display module 151b may be a flexible display or a transparent display. The user may laterally move a packing portion 151d that is connected to one end of the second display 151b, as shown by an arrow. More specifically, if the user moves the packing portion 151d to the left, the second display module 151b may be unrolled or unfolded from the space between the front case 100A-1 and the rear case 100A-2.

The second display module 151b may provide a display region 151c when unrolled or unfolded. The controller 180 may calculate a size of the display region 151c based on a degree to which the second display module 151b is ejected. The controller 180 may vary the size of the display region 151c according to the degree to and/or the length by which the second display module 151b is ejected.

Examples of the first display module 151a or the second display module 151b may include an LCD and an OLED that can visualize information. Since a touch pad is configured to overlap the first and second display modules 151a and 151b and thus form a layer structure, the first and second display modules 151a and 151b may serve as touch screens. Thus, the user may input various information to the mobile terminal 100 simply by touching the first and second display modules 151a and 151b. Both the first and second display module may be transparent displays.

The first audio output module 153a may be a receiver or a speaker. The first camera 121a may capture a still image or a moving image of the user. The microphone 123 may properly receive the user's voice or other sounds.

The first through third user input units 130a through 130c may be collectively referred to as the user input unit 130. The user input unit 130 may adopt various manipulation methods as long as it can offer tactile feedback to the user.

For example, the user input unit 130 may be implemented as a dome switch or a touch pad that receives a command or information upon being pushed or touched by the user. Alternatively, the user input unit 130 may be implemented as a wheel, a jog dial, or a joystick.

The first user input unit 130a may allow the user to input commands (such as 'start', 'end', and 'send'), the second user input unit 130b may be used to switch from one operating mode to another, and the third user input unit 130c may be used as a hot key for activating functions of the mobile terminal 100.

Figure 3:
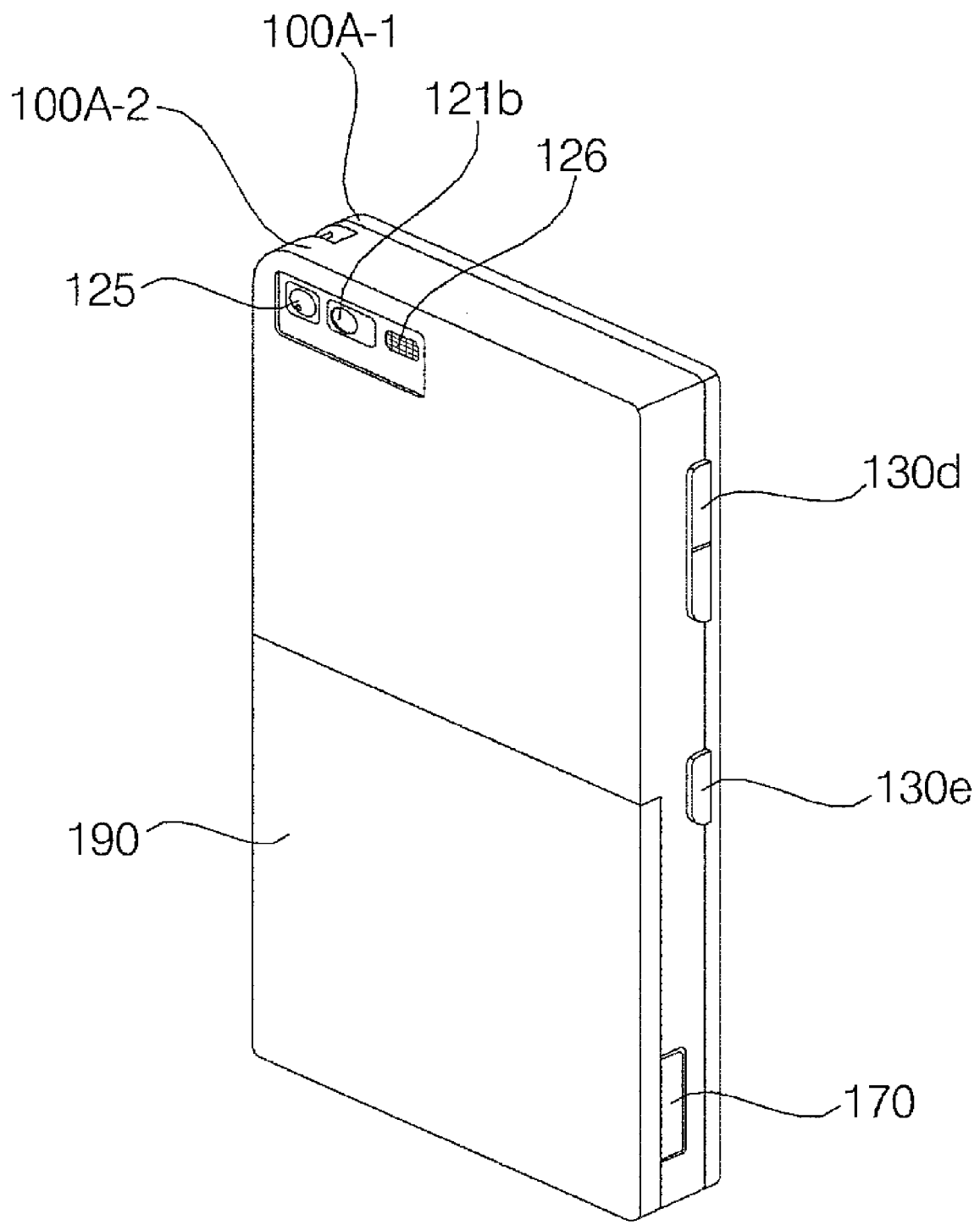
FIG. 3 illustrates a rear perspective view of the mobile terminal shown in FIG. 2.

FIG. 3 illustrates a rear perspective view of the mobile terminal 100 shown in FIG. 2. As shown in FIG. 3, a fourth user input unit 130d, a fifth user input unit 130e and the interface unit 170 may be provided on one side of the rear case 100A-2, and a second camera 121b may be provided at the rear of the rear case 100A-2.

The second camera 121b may have a different photographing direction from the first camera 121a shown in FIG. 2. The first camera 121a and the second camera 121b may have different resolutions. For example, the first camera 121a may capture and then transmit an image of the face of the user during a video call. Thus, a low-resolution camera may be used as the first camera 121a. The second camera 121b may capture an image of an ordinary subject. The image captured by the second camera 121b may not need to be transmitted. Thus, a high-resolution camera may be used as the second camera 121b.

A mirror 125 and a flash 126 may be provided near the second camera 121b. The mirror 125 may be used by a user to prepare himself or herself for taking a self shot. The flash 126 may illuminate a subject when the user attempts to capture an image of the subject with the second camera 121b.

A second audio output module (not shown) may be additionally provided in the rear case 100A-2. The second audio output module may provide a stereo function along with the first audio output module 153a. The second audio output module may also be used during a speaker-phone mode.

An antenna (not shown) for receiving a broadcast signal may be provided on one side of the rear case 100A-2. The antenna may be installed so as to be pulled out of the rear case 100A-2.

The interface unit 170 may serve as a path for allowing the mobile terminal 100 to exchange data with an external device. For example, the interface unit 170 may be a connector for connecting an earphone to the mobile terminal 100 in either a wired manner or a wireless manner, a port for short-range communication or a power supply port for supplying power to the mobile terminal 100. The interface unit 170 may be a card socket for accommodating an exterior card such as a SIM or UIM card or a memory card.

The second camera 121b and the other elements that have been described may alternatively be provided on the front case 100A-1.

The first camera 121a may be rotatable and thus may cover the photographing direction of the second camera 121b.

The power supply unit 190 may be provided in the rear case 100A-2. The power supply unit 190 may be a rechargeable battery and may be coupled to the rear case 100A-2 so as to be attachable to or detachable from the rear case 100A-2.

The proximity sensor 141 installed in the front case 100A-1 may detect an entity (such as a user's finger), nearby and approaching the display module 151 and may output a proximity signal. The proximity sensor 141 may output various proximity signals according to a distance between the display module 151 and the detected entity. A plurality of proximity sensors 141 with different detection ranges may therefore be provided. The distance between the display module 151 and the detected entity may be determined by comparing a plurality of proximity signals respectively provided by the plurality of proximity sensors 141. It may also be determined what part of the display module 151 is being approached by the detected entity and whether the detected entity is being moved within a close vicinity of the display module 15 by determining which of the plurality of proximity sensors 141 is outputting a proximity signal. The controller 180 may control the vibration module 157 to generate a haptic-effect signal corresponding to a touch key currently being approached by the detected entity.

Figure 4:
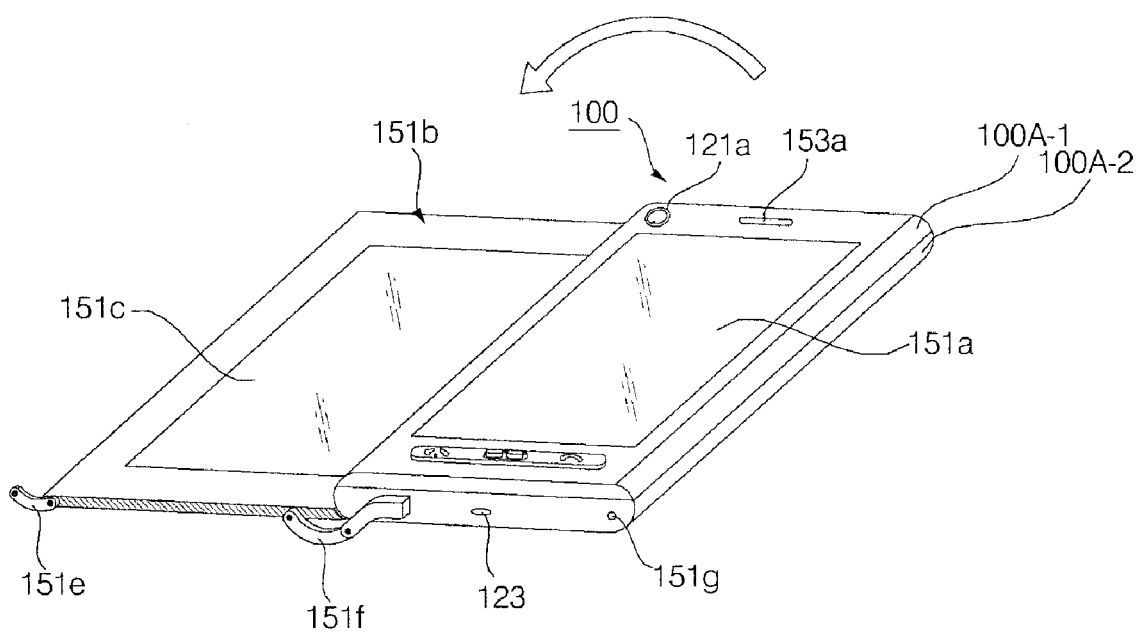
FIG. 4 illustrates a front perspective view of another example of the mobile terminal shown in FIG. 1.

FIG. 4 illustrates a perspective view of another example of the mobile terminal 100. As shown in FIG. 4, the second display module 151b may be able to be folded to cover the front case 100A-1. The second display module 151b may be opened up or closed, as shown by an arrow, using a first hinge 151e that can be inserted into a groove 151g on the rear case 100A-2. Even when the second display module 151b is opened up, the second display module 151b may still be connected to the rear case 100A-2 by a second hinge 151f.

The size of the display region 151c may increase in proportion to the degree to which the second display module 151b is opened up, and more particularly the angle between the second display module 151b and the first display module 151a. The controller 180 may determine (or measure) the length by which the second display module 151b is opened up, and may vary at least one of a scale of display, location, color, shape, type and/or number of objects displayed in the second display region 151c based on a result of the determination.

The second display module 151b may be rolled up in the mobile terminal 100, as shown in FIG. 2, or may be opened up or closed and thus to cover the mobile terminal 100, as shown in FIG. 4. However, embodiments of the present disclosure are not limited to this. That is, the second display module 151b may be implemented in various manners other than those set forth herein.

Figure 5:
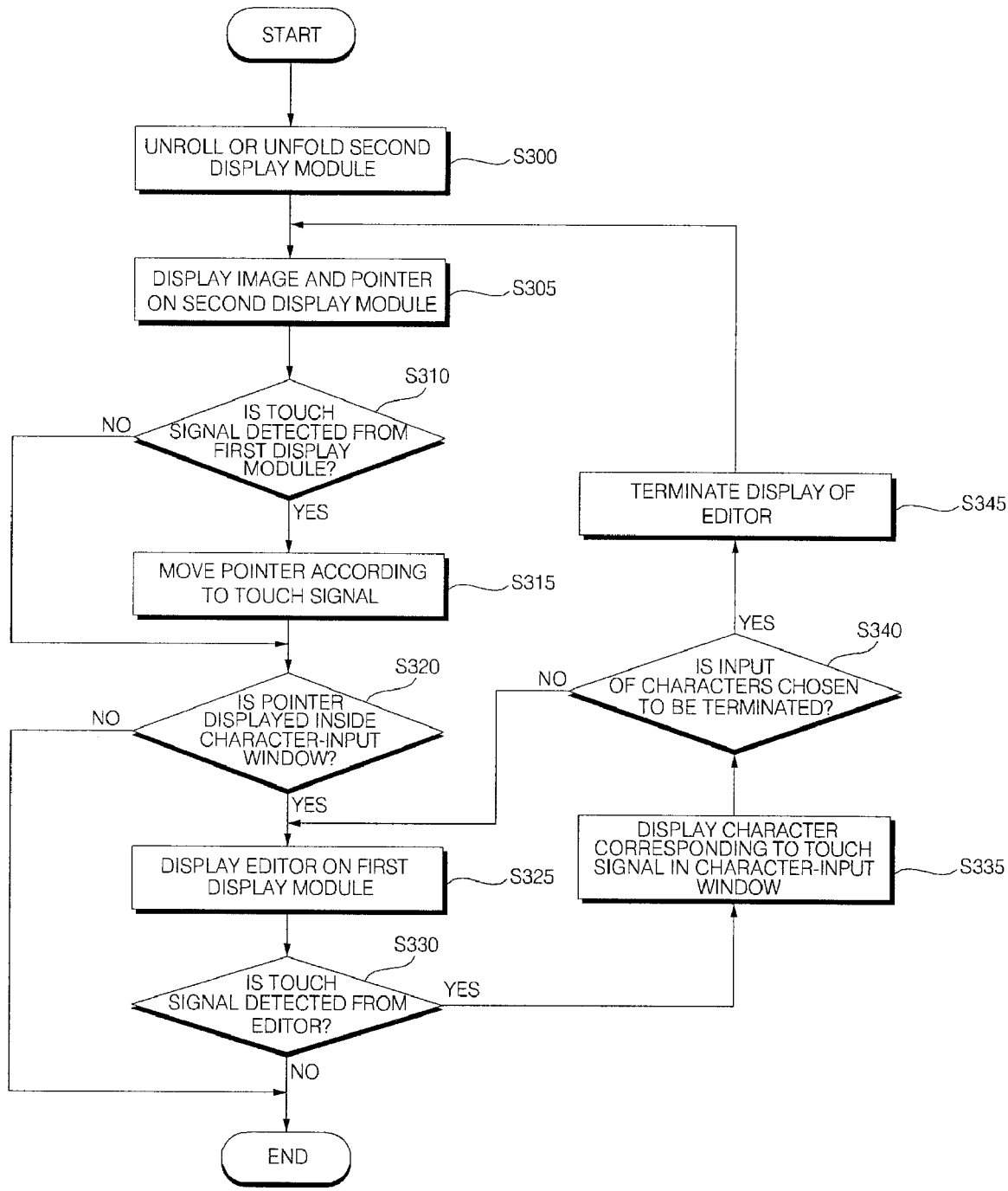
FIG. 5 illustrates a flowchart of a method of controlling a mobile terminal according to a first example embodiment.

FIG. 5 illustrates a flowchart of a method of controlling a mobile terminal according to a first example embodiment of the present disclosure. Other embodiments, operations and orders of operations are also within the scope of the present disclosure. As shown in FIG. 5, the second display module 151b may be ejected from the main body of the mobile terminal 100 in operation S300, whereas the first display module 151a capable of receiving a touch signal may be exposed outside the main body of the mobile terminal 100. The controller 180 may display a predetermined image and a pointer on the second display module 151b in operation S305. The scale of display of the predetermined image and the pointer may be determined by an amount by which the second display module 151b is ejected. The predetermined image may be a webpage received from a web server, a screen for displaying a broadcast service received via the broadcast reception module 111, and/or a menu screen for executing a menu. The predetermined image may be a moving image, a still image such as a photo, text data or a character-input window. The pointer may be used to point at a certain part of the predetermined image or a certain object in the predetermined image. An arrow or a hand may be displayed as the pointer.

The controller 180 may not display any image or any pointer on the first display module 151a in order for the first display module 151a to serve as a touch pad for a mouse. Alternatively, since the second display module 151b has a larger display region than the first display module 151a, the controller 180 may display a scrollbar and a scroll region on the first display module 151a. A menu icon or a menu screen, if any, displayed on the first display module 151a may be inactivated in operation S300, and then the first display module 151a may be used simply as a touch pad. In this example, the menu icon may not be executed even when selected in response to a touch signal input to the first display module 151a. Rather, the touch signal may be used to control the predetermined image.

The controller 180 may change the direction of display of the predetermined image based on data provided by the gravity sensor 143. For example, if the second display module 151b is horizontally ejected from the main body of the mobile terminal 100, the predetermined image may be horizontally displayed on the second display module 151b. On the other hand, if the second display module 151b is vertically ejected from the main body of the mobile terminal 100, the predetermined image may be vertically displayed on the second display module 151b.

The controller 180 may determine whether a touch signal with directivity has been detected from the first display module 151a in operation S310. The touch signal with directivity may be a drag signal. If it is determined in operation S310 that a drag signal has been detected from the first display module 151a, the controller 180 may move the pointer in operation S315 in response to the drag signal. The pointer may be moved in a drag direction corresponding to the input drag signal by a drag distance corresponding to the input drag signal. The first display module 151a may have a smaller display region than the second display module 151b. In order to properly move the pointer over all the entire display region on the second display module 151b by using the first display module 151a, the scroll region on the first display module 151a may need to be scrolled through using the scrollbar on the first display module 151a. In this manner, the pointer may be freely moved all over the entire display region on the second display module 151b by inputting a drag signal to the first display module 151a.

If it is determined in operation S310 that no drag signal has yet been detected from the first display module 151a, the controller 180 may determine, in operation S320, whether the pointer is displayed inside a character-input window for inputting characters. The character-input window may be displayed over the predetermined image. By using the character-input window, Korean characters, numerals, English characters, and/or special characters may be input.

If it is determined in operation S320 that the pointer is displayed inside the character-input window, the controller 180 may display an editor on the first display module 151a in operation S325. The editor may be a tool for inputting character. More specifically, when the pointer is displayed outside the character-input window, the first display module 151a may serve as a touch pad. On the other hand, when the pointer is displayed inside the character-input window, the first display module 151a may serve as an editor. The editor that can be displayed on the first display module 151a may be classified into a keyboard/keypad editor that includes a plurality of touch keys and may thus allow a character corresponding to whichever of the touch keys is selected in response to a touch signal, or an handwriting-recognition editor that converts an input stroke made in response to a touch signal into a character based on trajectory of the input stroke and may thus allow the character to be input.

If it is determined in operation S320 that the pointer is displayed outside the character-input window, then the method may end. The controller 180 may change the direction of display of an editor on the first display module 151a based on data provided by the gravity sensor 143.

The controller 180 may determine whether a touch signal has been detected from the editor displayed on the first display module 151a in operation S330. If it is determined in operation S330 that a touch signal has been detected from the editor displayed on the first display module 151a, the controller 180 may display a character corresponding to the input touch signal in the character-input window in operation S335. For example, if the editor displayed on the first display module 151a is a keypad-type editor, a character corresponding to a position from which the input touch signal has been detected may be displayed in the character-input window. On the other hand, if the editor displayed on the first display module 151a is a handwriting-recognition editor, a character corresponding to the trajectory of an input stroke made in response to the input touch signal may be displayed in the character-input window.

Thereafter, if the user chooses to terminate the display of the character corresponding to the input touch signal in operation S340, the controller 180 may terminate the display of the character corresponding to the input touch signal in operation S345. Otherwise, the method may return to the operation S325.

If it is determined in operation S330 that no touch signal has yet been detected from the editor displayed on the first display module 151a, then the method may end.

Figure 6:
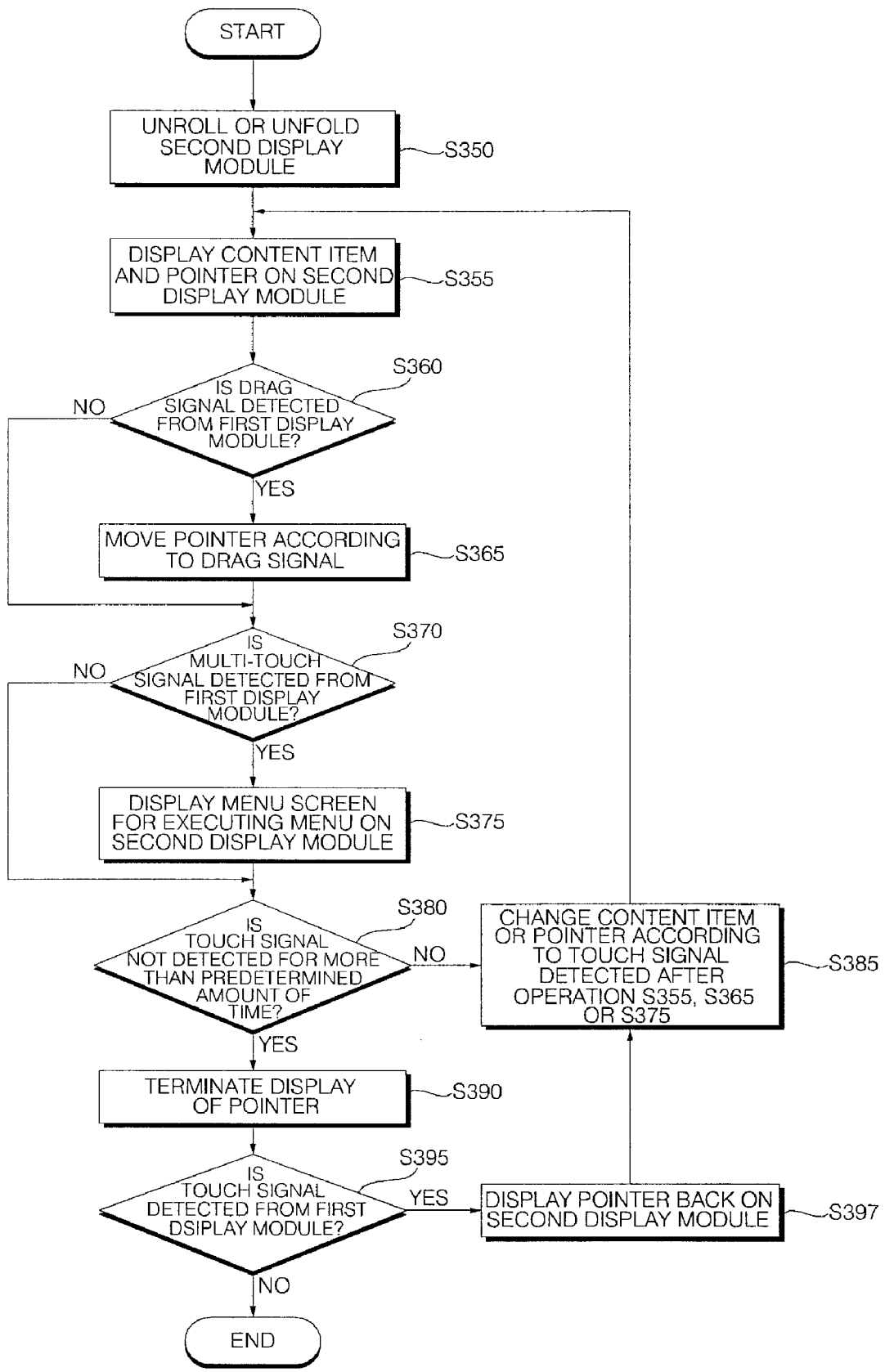
FIG. 6 illustrates a flowchart of a method of controlling a mobile terminal according to a second example embodiment.

FIG. 6 illustrates a flowchart of a method of controlling a mobile terminal according to a second example embodiment of the present disclosure. Other embodiments, operations, and orders of operations may also be within the scope of the present disclosure. As shown in FIG. 6, the second display module 151b may be ejected from the main body of the mobile terminal 100 in operation S350, whereas the first display module 151a capable of receiving a touch signal may be exposed outside the main body of the mobile terminal 100. A menu icon or a menu screen for executing a predetermined menu may be displayed on the first display module 151a.

The controller 180 may display a content item and a pointer on the second display module 151b in operation (S355). The content item may be a webpage received from a web server or a digital multimedia broadcasting (DMB) program. The content item may be a moving image, a still image and/or text data. A number of icons for performing various operations on the content item may also be displayed on the second display module 151*b*. For example, a 'save' icon for saving the content item, a 'scroll' icon for scrolling through the content item, and a 'play' icon for playing the content item may be displayed on the second display module 151*b*. If the second display module 151*b* is implemented as a touch screen, one of the icons displayed on the second display module 151*b* may be selected in response to a touch signal.

The controller 180 may not display any image or any pointer on the first display module 151*a* in order for the first display module 151*a* to serve as a touch pad for a mouse. Alternatively, the menu icon or the menu screen displayed on the first display module 151*a* may be inactivated in operation S350, and then the first display module 151*a* may be simply used as a touch pad. In this example, the menu icon may not be executed even when selected in response to a touch signal input to the first display module 151*a*. Rather, the touch signal may be used to control the predetermined image.

The controller 180 may determine whether a touch signal with directivity has been detected from the first display module 151*a* in operation S360. The touch signal with directivity may be a drag signal. If it is determined in operation S360 that a drag signal has been detected from the first display module 151*a*, the controller 180 may move the pointer in response to the input drag signal in operation S365. More specifically, the pointer may be moved in a drag direction corresponding to the input drag signal by a drag distance corresponding to the input drag signal. Since the first display module 151*a* has a smaller display region than the second display module 151*b*, the distance by which the pointer is moved on the second display module 151*b* may be the same as or may be proportional to the drag distance corresponding to the input drag signal. If it is determined in operation S360 that no drag signal has yet been detected from the first display module 151*a*, the method may proceed to operation S370.

The controller 180 may determine whether more than one touch signal has been detected in a row at regular intervals of time from a certain point or part of the first display module 151*a* in operation S370. The certain point or part of the first display module 151*a* may be chosen by the user. If it is determined in operation S370 that more than a plurality of touch signals have been detected in a row from the certain point or part of the first display module 151*a*, a menu or item currently being pointed at by the pointer may be selected, and a screen for executing the selected menu or item may be displayed on the second display module 151*b* in operation S375. For example, if a plurality of touch signals are detected from the certain point or part of the first display module 151*a* when a plurality of product images are displayed on the second display module 151*b* and one of the product images is pointed at by the pointer, then detailed product information corresponding to the pointed-to product image may be displayed on the second display module 151*b*. Since a menu screen for executing a menu is deemed as a type of content, a menu screen for executing a menu may be displayed on the second display module 151*b* along with a pointer.

On the other hand, if it is determined in operation S370 that a plurality of touch signals have not yet been detected in a row from the certain point or part of the first display module 151*a*, then the method may proceed to operation S380.

The controller 180 may determine whether no touch signal has been detected from the first display module 151*a* for more than a predetermined amount of time in operation S380. The predetermined amount of time may be set by the user. If it is determined in operation S380 that a touch signal has been detected from the first display module 151*a* within the predetermined amount of time after operation S355, S365 or S375, the controller 180 may change the content item or the pointer according to the detected touch signal (S385), and the method may return to the operation S355. For example, if the detected touch signal is a drag signal, the pointer may be moved according to the drag signal. On the other hand, if the detected touch signal is a multi-touch signal, a menu or item currently being pointed at by the pointer may be selected, and a screen for executing the selected menu or item may be displayed on the second display module 151*b*. On the other hand, if the detected touch signal is a touch signal with no directivity, the content item and/or the pointer may remain unchanged.

If it is determined in operation S380 that no touch signal has been detected from the first display module 151*a* for more than the predetermined amount of time then, the controller 180 may terminate the display of the pointer on the second display module 151*b* (S390). If no signal is detected from the first display module 151*a* for more than the predetermined amount of time, then the pointer may disappear from the second display module 151*b*.

The controller 180 may determine whether a touch signal has been detected from the first display module 151*a* after termination of the display of the pointer in operation S395. If it is determined in operation S395 that a touch signal has been detected from the first display module 151*a* after the termination of the display of the pointer, the controller 180 may display the pointer back on the second display module 151*b* in operation S397, and then the method may return to the operation S385.

Figure 7:
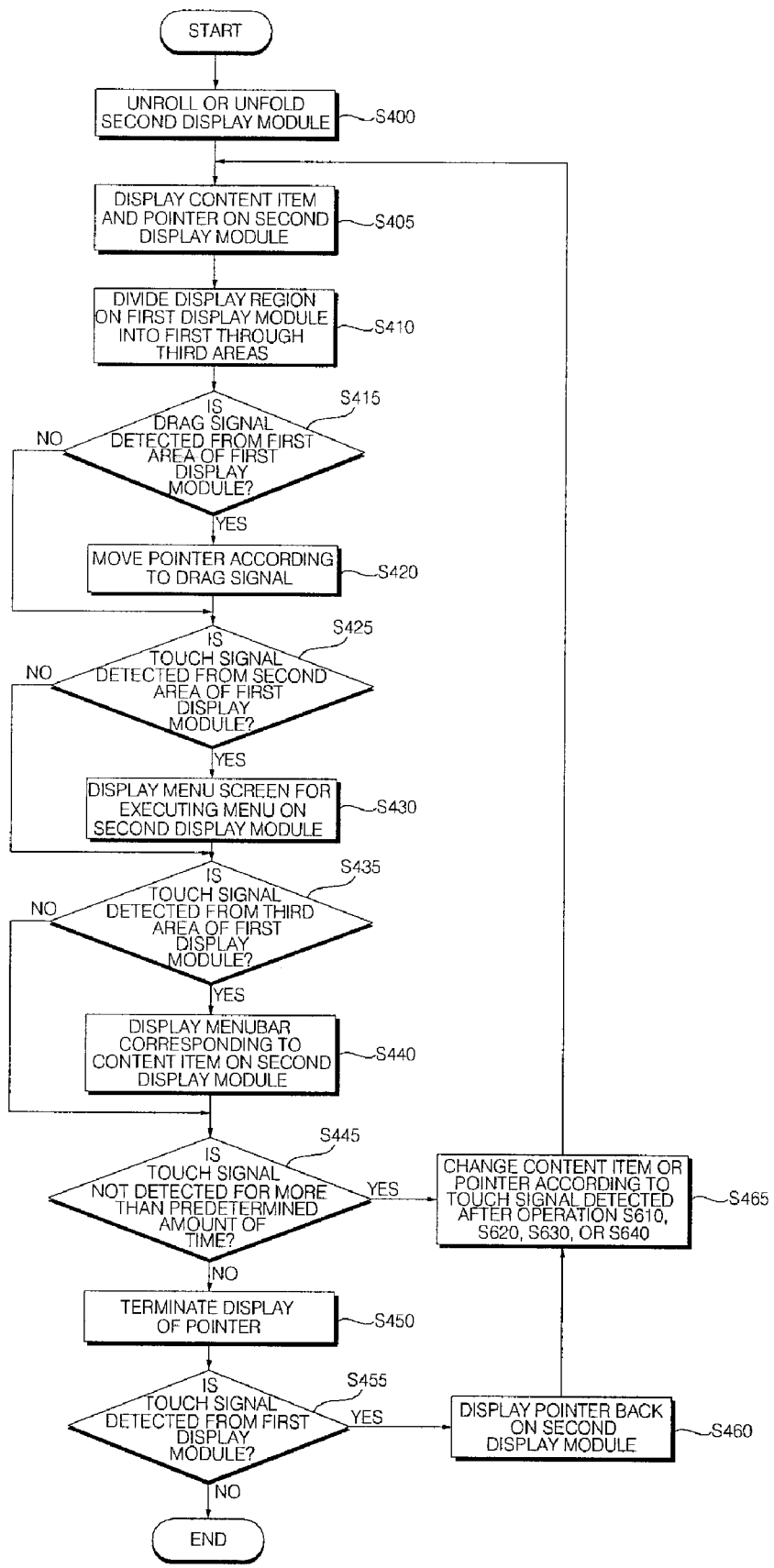
FIG. 7 illustrates a flowchart of a method of controlling a mobile terminal according to a third example embodiment.

FIG. 7 illustrates a flowchart of a method of controlling a mobile terminal according to a third example embodiment of the present disclosure. Other embodiments, operations and orders of operations may also be within the scope of the present disclosure. As shown in FIG. 7, the second display module 151*b* may be ejected from the main body of the mobile terminal 100 in operation S400. The controller 180 may display a content item and a pointer on the second display module 151*b* in operation S405. The content item may be a webpage received from a web server or a DMB program. A number of icons for performing various operations on the content item may also be displayed on the second display module 151*b*.

The controller 180 may divide a display region on the first display module 151*a* into three areas (i.e., first through third areas) in operation S410. The manner in which the display region of the first display module 151*a* is divided may be determined by the user. For example, the display region of the first display module 151*a* may be equally or unequally divided into three areas. The first through third areas obtained by dividing the display region of the first display module 151*a* may have different functions.

The controller 180 may determine whether a touch signal with directivity has been detected from the first area of the first display module 151*a* in operation S415. The touch signal with directivity may be a drag signal. If it is determined in operation S615 that a drag signal has been detected from the first area of the first display module 151*a*, the controller 180 may move the pointer according to the drag signal in operation S420. On the other hand, if it is determined in operation S615 that no drag signal has yet been detected from the first area of the first display module 151*a*, then the method may proceed to operation S425.

The controller 180 may determine whether a touch signal has been detected from the second area of the first display module 151*a* in operation S425. If it is determined in operation S425 that a touch signal has been detected from the second area of the first display module 151*a*, a menu or item currently being pointed at by the pointer may be selected, and a screen for executing the selected menu or item may be displayed in operation S430. That is, the second area of the first display module 151a may serve as the left button of a mouse. Since a menu screen for executing a menu is a type of content, a menu screen for executing a menu may be displayed on the second display module 151b along with a pointer. If it is determined in operation S425 that no touch signal has been detected from the second area of the first display module 151a, then the method may proceed to operation S435.

The controller 180 may determine whether a touch signal has been detected from the third area of the first display module 151a in operation S435. If it is determined in operation S435 that a touch signal has been detected from the third area of the first display module 151a, then the controller 180 may display a menu corresponding to the content item in operation S440. The menu corresponding to the content item may include menus for editing, printing and saving the content item. That is, the third area of the first display module 151a may serve as the right button of a mouse. The menu bar corresponding to the content item may be displayed opaquely over the content item. If it is determined in operation S635 that no touch signal has been detected from the third area of the first display module 151a, then the method may proceed to operation S445.

The controller 180 may determine whether no touch signal has been detected from any one of the first through third areas of the first display module 151a for more than a predetermined amount of time in operation S640. If it is determined in operation S640 that a touch signal has been detected from the first display module 151a within the predetermined amount of time after operation S410, S420, S430 or S440, the controller 180 may change the content item or the pointer according to the type and the point of detection of the touch signal in operation S465. For example, if a touch signal has been detected from the first area of the first display module 151a within the predetermined amount of time after operation S410, S420, S430 or S440, the pointer may be moved according to the touch signal. On the other hand, if a touch signal has been detected from the second area of the first display module 151a within the predetermined amount of time after operation S410, S420, S430 or S440, a menu bar corresponding to the content item may be displayed. On the other hand, if a touch signal has been detected from the third area of the first display module 151a within the predetermined amount of time after operation S410, S420, S430 or S440, information regarding the content item may be displayed on the second display module 151b.

If it is determined in operation S440 that no touch signal has been detected from any one of the first through third areas of the first display module 151a for more than the predetermined amount of time, the controller 180 may terminate the display of the pointer on the second display module 151b in operation S450.

The controller 180 may determine whether a touch signal has been detected from the first display module 151a after termination of the display of the pointer in operation S455. If it is determined in operation S455 that a touch signal has been detected from the first display module 151a after termination of the display of the pointer, the controller 180 may display the pointer back on the second display module 151b in operation S460, and then the method may return to the operation S465.

Figure 8:
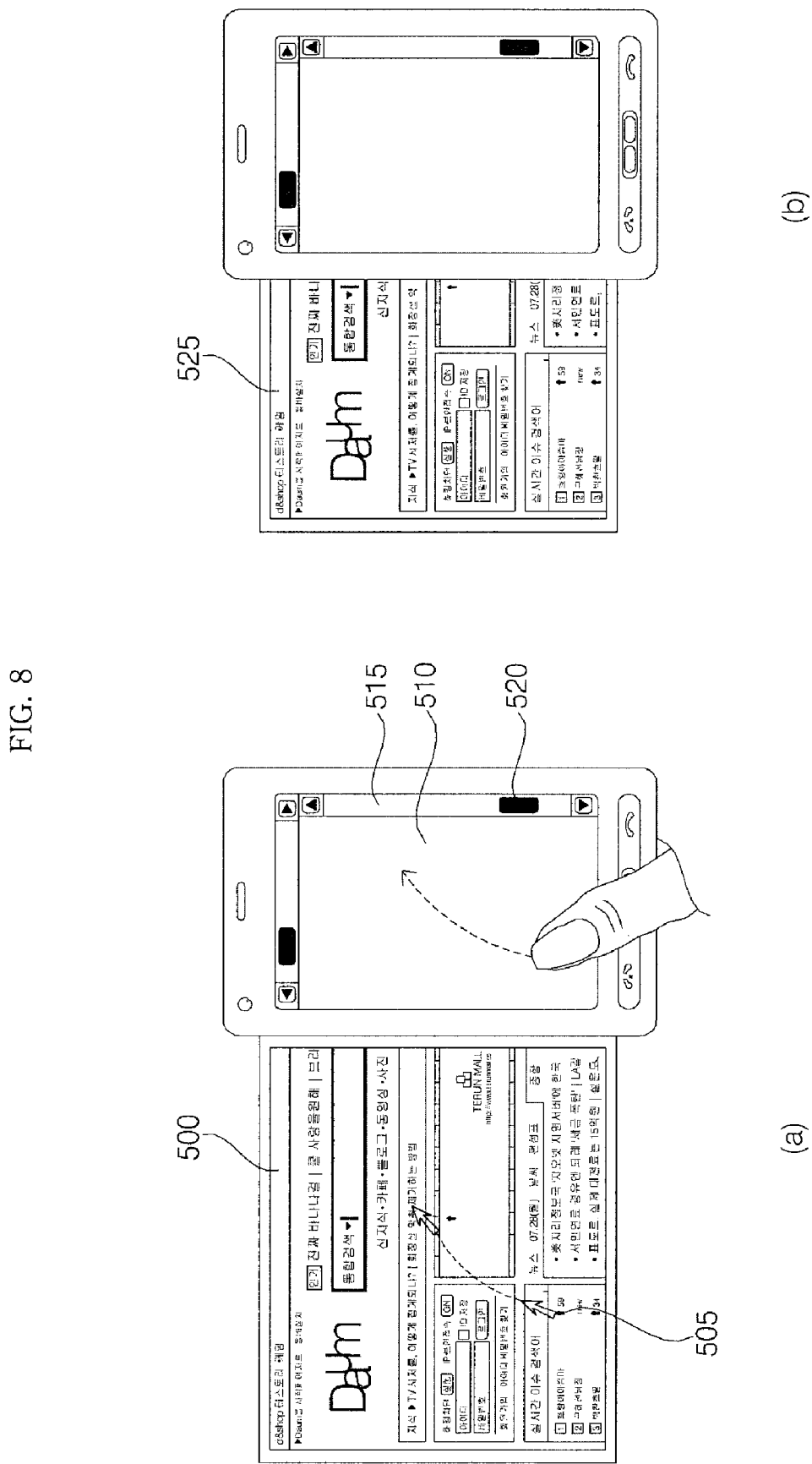
FIGS. 8 through 10 illustrate diagrams for explaining the method of the first example embodiment.
Figure 9:
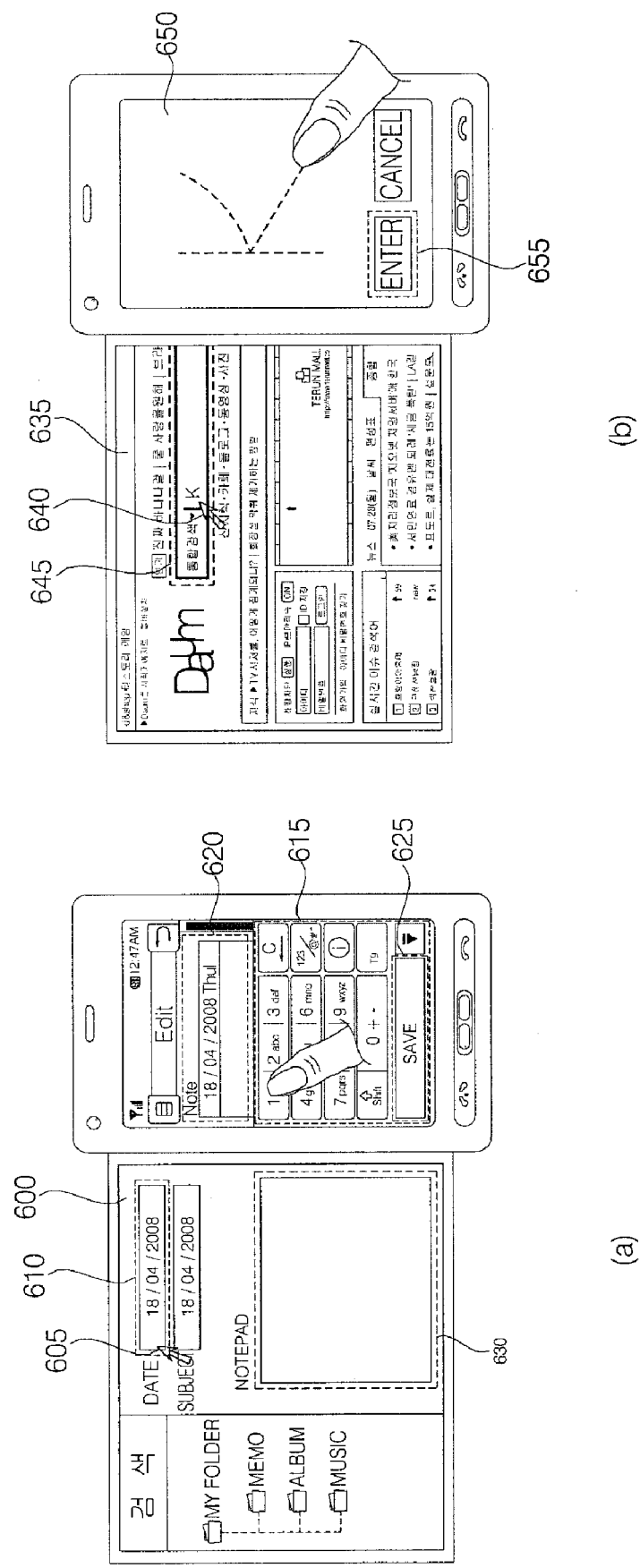
Figure 10:
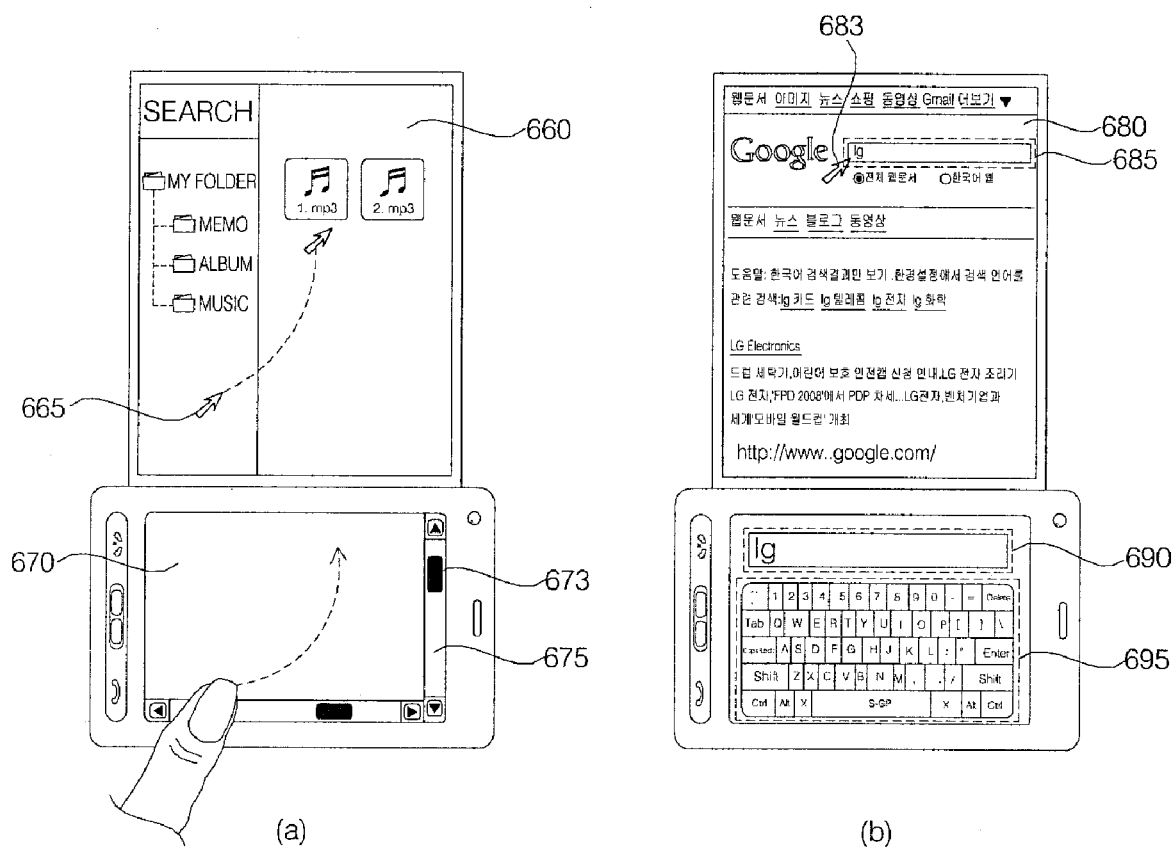

FIGS. 8 through 10 illustrate diagrams for explaining the first example embodiment.

As shown in FIG. 8(a), when the second display module 151b is completely ejected from the main body of the mobile terminal 100, a webpage 500 and a pointer 505 may be displayed on the second display module 151b. A scrollbar 520 and a scroll region 515 may be displayed on the first display module 151a. If an input drag signal is detected from the first display module 151, the pointer 505 may be moved in a drag direction corresponding to the input drag signal by a drag distance corresponding to the input drag signal. On the other hand, when the second display module 151b is partially ejected from the main body of the mobile terminal 100 such as in FIG. 8(b), then only part of the webpage 505 may be displayed on the second display module 151b.

As shown in FIG. 9(a), a notepad menu 600 and a pointer 605 may be displayed on the second display module 151b, and a keypad-type editor 615 for inputting numerals and English characters may be displayed on the first display module 151a. One or more characters input via the keypad-type editor 615 may be displayed in a character-input window 610. If one of the input characters is selected, then the selected input character may be in a window 620 displayed on the first display module 151a. If a 'save' icon 625 displayed on the first display module 151a is selected, then the input of characters may be terminated. Alternatively, as shown in FIG. 9(b), if a pointer 650 is displayed inside a search-word-input window 645 in a webpage 635 displayed on the second display module 151b, then a handwriting-recognition editor 650 may be displayed on the first display module 151a. An input stroke made on the first display module 151a via the handwriting-recognition editor 650 may be converted into a character, and the character may be displayed in the search-word-input window 645. If an 'enter' icon 655 displayed on the first display module 151a is selected, then the input of characters may be terminated.

As shown in FIG. 10(a), a file-search screen 660 and a pointer 665 may be displayed on the second display module 151b. A direction of display of the file-search screen 660 and the pointer 665 may be determined based on data provided by the gravity sensor 143. More specifically, the file-search screen 660 may be vertically displayed in parallel with the direction in which the second display module 151b is ejected from the main body of the mobile terminal 100. A scrollbar 673 and a scroll region 675 may be displayed on a touch screen 670 of the first display module 151a. If a drag signal is detected from the touch screen 670, then the pointer 665 may be moved, as shown by a dotted line, in a drag direction corresponding to the drag signal by a drag distance corresponding to the drag signal.

As shown in FIG. 10(b), a webpage 680 and a pointer 683 may be displayed on the second display module 151b, and a keypad-type editor 695 may be displayed on the first display module 151b. The direction of display of the webpage 680 and the pointer 683 and the direction of display of the keypad-type editor 695 may be determined based on data provided by the gravity sensor 143. The pointer 683 may be displayed inside a search-word-input window 685 in the webpage 680. If a number of characters are input via the keypad-type editor 695, then the input characters may be displayed in the search-word-input window 690. The input characters may also be displayed in a window 690 included in the keypad-type editor 695.

Figure 12:
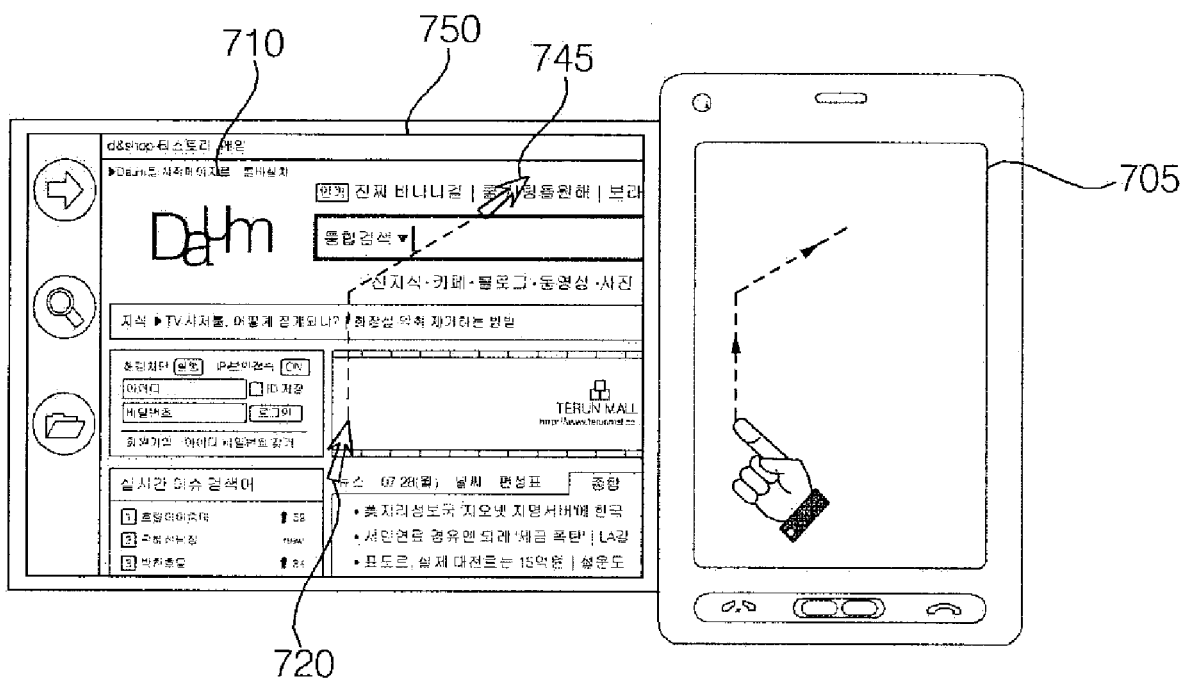

FIGS. 11 through 13 illustrate diagrams for explaining the second example embodiment.

As shown in FIG. 11(a), if the second display module 151b is completely ejected from the main body of the mobile terminal 100, then a screen 705 including a webpage 710, a number of icons 715 for performing various operations in the webpage 710 (such as an icon for navigating to a webpage next to the webpage 710 or an icon for enlarging the webpage 710) and a pointer 720 may be displayed on the second display module 151b, and an idle screen 705 may be displayed on the first display module 151a. In this example, even if a touch signal is input to the first display module 151a, the idle screen 705 may remain unchanged. Rather, the input touch signal may be used to control the screen 700. As shown in FIG. 11(b), if the second display module 151b is only partially ejected from the main body of the mobile terminal 100, a screen 725 including part of the webpage 703 may be displayed on the second display module 151b.

FIG. 12(a) shops a screen 750 where if a drag signal is detected from the first display module 151a when the screen 750 is displayed on the second display module 151b, then the pointer 720 may be moved according to the drag signal. Since the first display module 151a has a smaller display region than the second display module 151b, the distance by which the pointer 720 is moved may be proportional to a drag distance corresponding to the drag signal.

As shown in FIGS. 13(a) and 13(b), if two touch signals are detected from the same point or region on the first display module 151a when a screen including the webpage 710 is displayed on the second display module 151b, then an item currently being pointed at by the pointer 755 may be executed and a webpage 760 may be displayed on the second display module 151b.

FIGS. 14 through 17 illustrate diagrams for explaining the third example embodiment.

Figure 14:
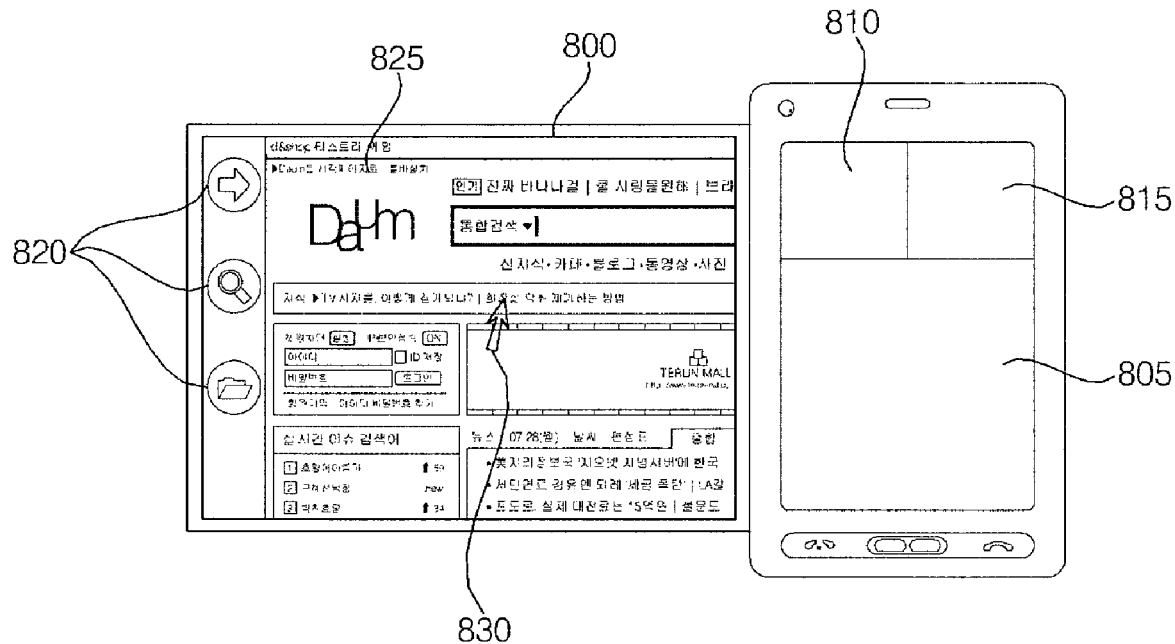
FIGS. 14 through 17 illustrate diagrams for explaining the method of the third example embodiment.
Figure 15:
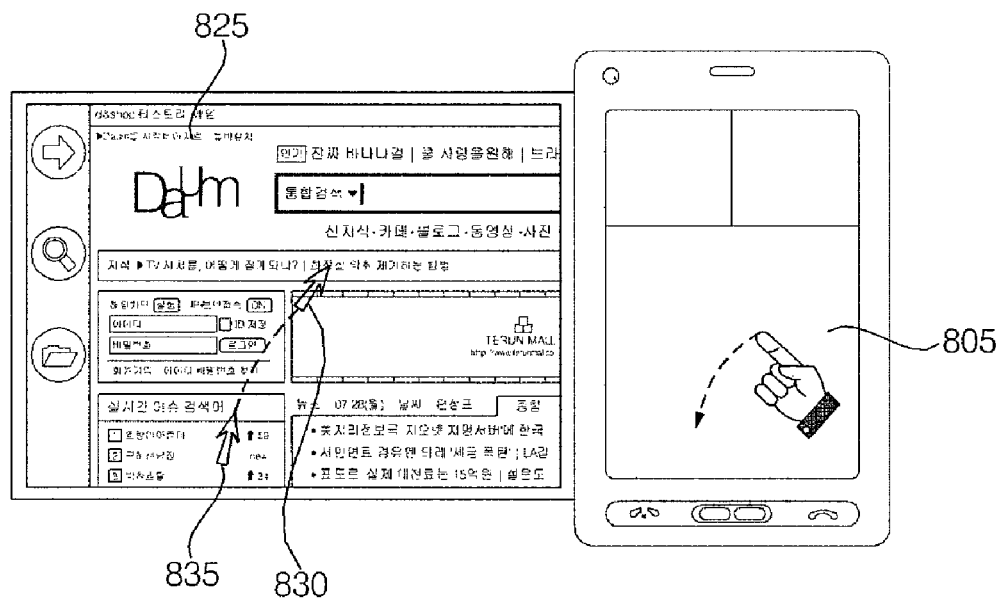
Figure 16:
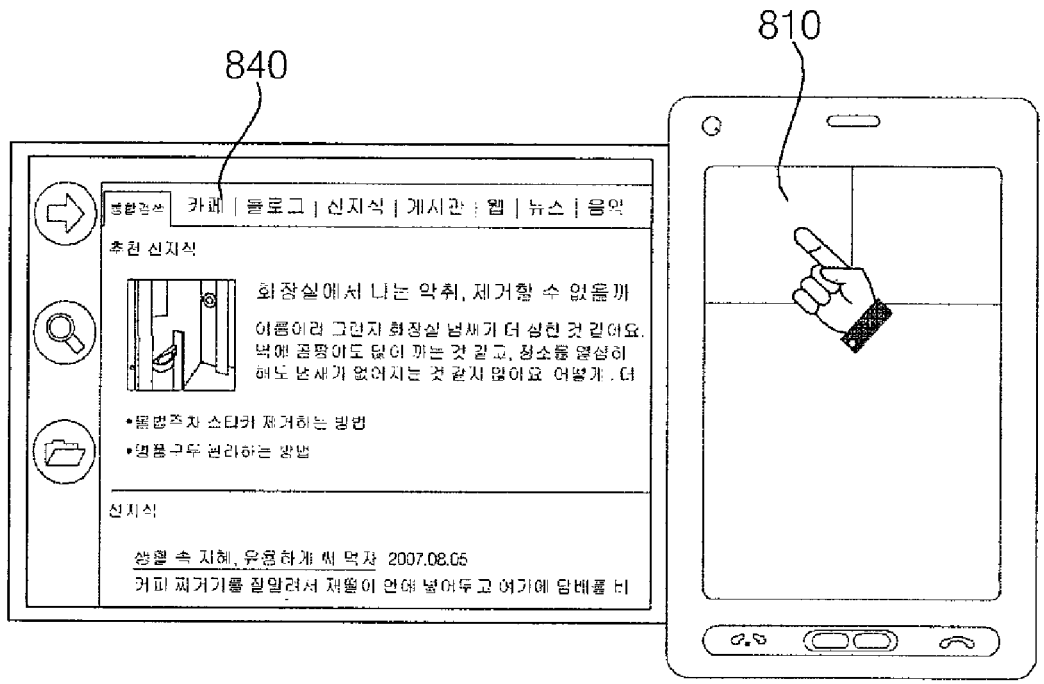
Figure 17:
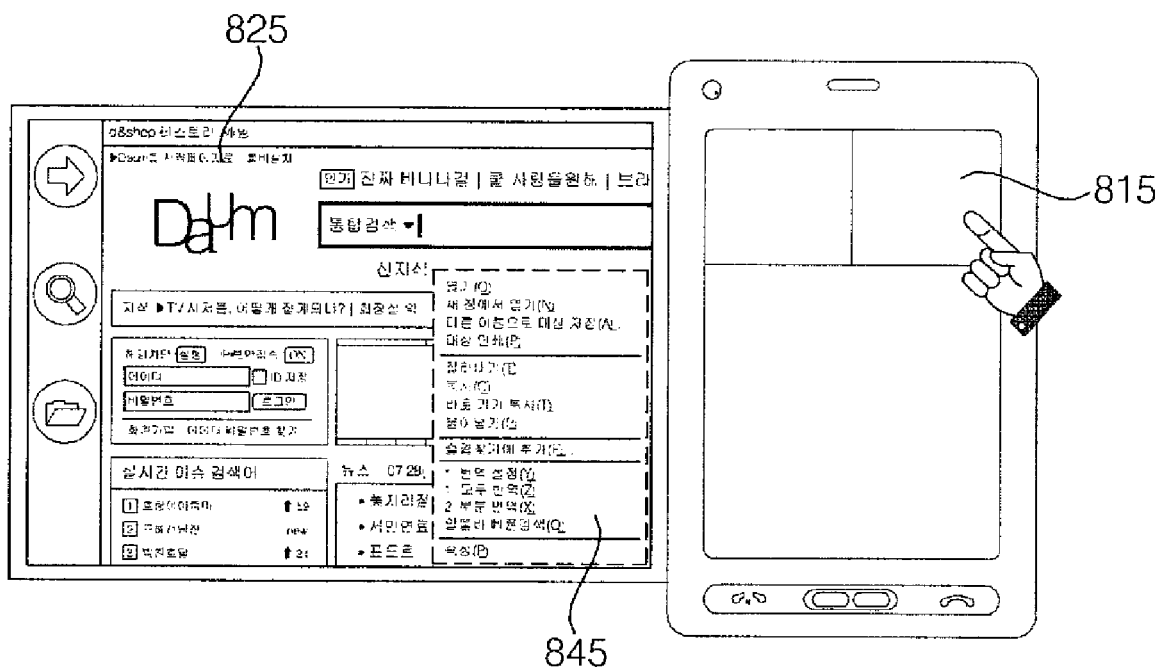

As shown in FIG. 14, a screen 800 including a webpage 825, a number of menu icons 820 for performing various operations on the webpage 825 (such as an icon for navigating to a webpage next to the webpage 825 or an icon for enlarging the webpage 825) and a pointer 830 may be displayed on the second display module 151b, and a display region on the first display module 151a may be divided into three areas, namely first, second and third areas 805, 810 and 815. As shown in FIG. 15, if a touch signal with directivity is detected from the first area 805, the pointer 830 may be moved according to the detected touch signal. On the other hand, as shown in FIG. 16, if a touch signal is detected from the second area 810, an item currently being pointed at by the pointer 830 may be executed and thus a webpage 840 including information regarding the pointed-to item may be displayed on the second display module 151b. On the other hand, as shown in FIG. 17, if a touch signal is detected from the third area 815, a menu bar 846 corresponding to the webpage 825 may be displayed opaquely over the webpage 825.

Embodiments of the present disclosure may be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium may include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing embodiments of the present disclosure may be easily construed by one of ordinary skill in the art.

According to embodiments of the present disclosure, an image may be displayed on a flexible display and a character-input operation and/or a search operation may be performed using an additional touch screen.

In addition, according to embodiments of the present disclosure, an image may be displayed on an extensible flexible display and the display of the image may be easily controlled using a touch screen.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a first display configured to be a touch panel, the touch panel configured to display at least one of text, symbols or an image;
   a second display, the first and second display configured to move relative to each other such that the first display and the second display are configured to be positioned adjacent to each other; and
   a controller to control the first display and the second display, the second display displays an image and a pointer when the second display and the first display are positioned adjacent to each other, the first display to receive a touch input having a directional movement on the first display while the image and the pointer are displayed on the second display, and the pointer moves on the second display according to the directional movement of the touch input on the first display.

2. The display device of claim 1, wherein the second display is a flexible display that is retractable from the first display.

3. The display device of claim 1, wherein a screen of the second display for executing an item currently being pointed at by the pointer on the second display when sequential touch signals are detected from the first display.

4. The display device of claim 1, wherein when a character-input window is provided on the second display and the pointer is displayed in the character-input window on the second display, the first display displays an editor for inputting various characters on the first display.

5. The display device of claim 4, further comprising a gravity sensor, wherein an orientation of the image and the character-input window changes based on data provided by the gravity sensor.

6. The display device of claim 1, wherein when an item provided on the second display is selected based on a user input on the first display, the image on the second display is changed to display a corresponding image related to the selected item.

7. A display device, comprising:
a first display configured to be a touch panel, the touch panel configured to display at least one of text, symbols or an image;
a second display, the first and second display configured to move relative to each other such that the first display is configured to be positioned adjacent to the second display; and
a controller to control the first and second displays, wherein a cursor is provided on the second display and the touch panel is used as a touch pad for user to input a directional touch input, and the controller to control the second display to move the cursor on the second display based on the directional touch input on the first display.

8. A method of controlling a display device that includes a first display configured to be a touch panel, the touch panel configured to display at least one of text, symbols or an image, and a second display, the first and second displays configured to move relative to each other such that the first display is configured to be positioned adjacent to the second display, the method comprising:
providing the first display and the second display to be adjacent to each other;
providing a cursor on the second display;
using the touch panel as a touch pad;
receiving a directional touch input on the touch panel while the cursor is provided on the second display; and
moving the cursor displayed on the second display based on the directional touch input on the touch panel.

9. A method of controlling a display device that includes a first display configured to be a touch panel, the touch panel configured to display at least one of text, symbols or an image, and a second display, the first and second displays a configured to move relative to each other such that the first display is configured to be positioned adjacent to the second display, the method comprising:
providing the second display and the first display to be adjacent to each other;
displaying an image and a pointer on the second display;
receiving a touch input having a directional movement on the first display; and
moving the pointer on the second display according to the directional movement of the touch input on the first display.

10. The method of claim 9, further comprising displaying a screen for executing an item currently being pointed at by the pointer on the second display when a sequence of touch signals are detected from the touch panel selecting the item.

11. The method of claim 9, wherein the pointer disappears from the second display when a touch signal is not detected on the first display for more than a predetermined amount of time.

12. The method of claim 9, further comprising displaying a plurality of icons for performing various operations on the image displayed on the second display, wherein the plurality of icons included at least an icon for scrolling the image.

13. The method of claim 9, further comprising:
displaying a character-input window on the second display, and
displaying an editor for inputting various characters on the first display when the pointer is displayed in the character-input window on the second display.

14. The method of claim 13, wherein the editor includes a keypad-type editor or a handwriting-recognition editor.

15. The method of claim 13, further comprising changing a direction of display of the image and the character-input window based on data provided by a gravity sensor.

16. The method of claim 9, further comprising displaying a scrollbar and a scroll region on the first display.

17. The method of claim 9, wherein displaying the image comprises displaying a portion of the image when the second display is only ejected partially from the first display, and the area of the displayed image portion corresponds to a degree to which the second display is ejected from the first display.

18. The method of claim 9, wherein the image is one of a webpage, a broadcast service screen and a menu screen.

19. The method of claim 9, further comprising:
selecting an item provided on the second display based on the user input on the first display; and
changing the image on the second display to display a corresponding image related to the selected item.

20. The method of claim 19, further comprising displaying a menu bar on the first display corresponding to the image on the second display.

21. The method of claim 20, wherein the menu bar includes an 'edit' menu and a 'save' menu.

* * * * *